July 20, 1926.
E. J. HOLLOPETER ET AL
1,593,077
REBOUND CHECK FOR AUTOMOBILE SPRINGS
Filed Nov. 12, 1923
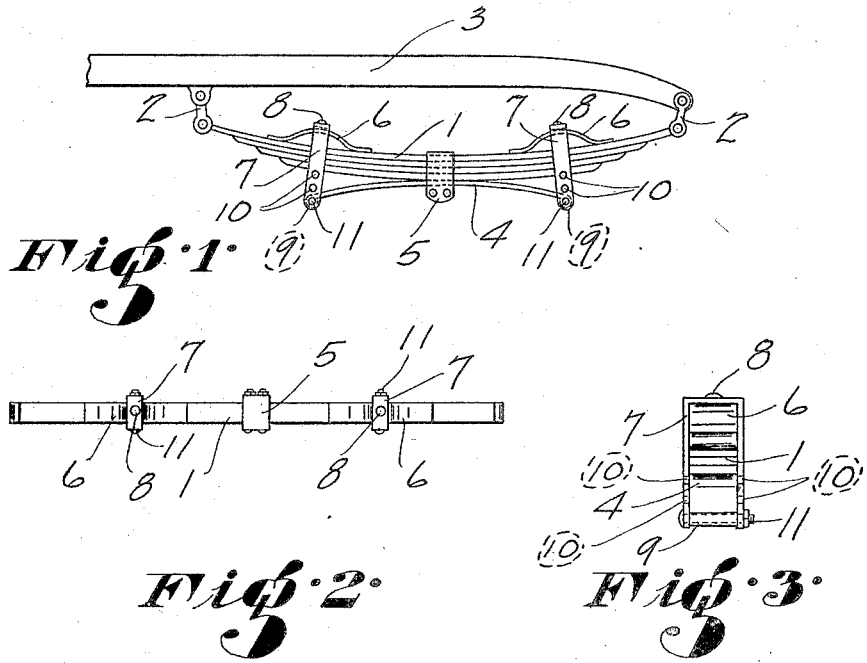

Patented July 20, 1926.

1,593,077

UNITED STATES PATENT OFFICE.

EDWARD J. HOLLOPETER AND THEODORE C. GOEGLEIN, OF DURANGO, COLORADO.

REBOUND CHECK FOR AUTOMOBILE SPRINGS.

Application filed November 12, 1923. Serial No. 674,180.

The invention is in the way of a set of rebound checks for automobile springs, and the object is to provide means for checking excessive spring rebounds in automobiles, which rebounds frequently result in breaking the springs.

In the drawing—

Figure 1 is an elevation of the attachment as applied to an ordinary semi-elliptic spring;

Figure 2 is a plan view of the spring assembly;

Figure 3 is an end view of the spring assembly;

Figure 4 is a detail of the lower rebound check spring;

Figure 5 is a detail of one of the two upper shock check springs.

In combination with an ordinary semi-elliptic spring 1, or the lower half of a full elliptic spring, attached by shackles 2 of an automobile 3, the invention consists of a lower curved leaf spring 4, designated a rebound check spring, which has its ends curled over to form bolt sleeves 9, and is set with its convexed face up under the conventional spring 1 and secured thereto by the usual central shackle 5; and two upper, relatively short, curved leaf springs 6, designated shock check springs, and set on top of the spring 1, one at each end thereof and with their convexed sides upward and ends bearing down upon the spring 1. Shackles 7, in the form of an inverted U, are then set over the middles of the upper springs 6, and are secured thereto by rivets 8. The sides of the shackles 7 pass down across the sides of the spring 1, and are pierced with a series of aligned adjustment bolt holes 10. The springs 6 are then drawn to a proper tension against the ends of the spring 4, and are secured in place by bolts 11 passed through any aligned pair to the bolt holes 10 and through the bolt sleeves 9. The series of bolt holes 10 permits the adjustment of the springs to be made at any desired tension.

The operation and use of the check springs are apparent from the foregoing description. If greater strength or stiffness is desired, the springs 4 and 6 may be doubled or trebled.

While we have herein described a certain specific manner and method of construction and assembling the elements of our invention, it is understood that we may vary from the same in minor details, not departing from the spirit of our invention, so as best to construct a practical device for the purpose intended, as defined in the appended claim.

We claim:

In combination with a conventional semi-elliptic vehicle spring, a set of check springs for the same, comprising a lower curved leaf spring having bolt sleeves at its ends and set with its convexed face up under and shackled to the conventional spring; two upper, relatively short, curved leaf springs set on top of the conventional spring, one at each end thereof with their convexed sides upward; U-shaped shackles, pierced with series of aligned bolt holes, set inverted over the middles of the upper springs, with their sides passed down across the sides of the conventional spring; and bolts passed through any of the aligned shackle bolt holes and through the bolt sleeves of the lower spring.

In testimony whereof we affix our signatures.

EDWARD J. HOLLOPETER.
THEODORE C. GOEGLEIN.